United States Patent
Murphy et al.

(10) Patent No.: US 6,721,394 B1
(45) Date of Patent: Apr. 13, 2004

(54) METHOD FOR REDUCING NOISE FROM AN ASYMMETRIC DIGITAL SUBSCRIBER LINE MODEM

(75) Inventors: Tim Murphy, Ramona, CA (US); Lloyd Sarsoza, San Diego, CA (US); Martin Staszak, Poway, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/458,568

(22) Filed: Dec. 9, 1999

(51) Int. Cl.$^7$ ............................. H04M 1/24; H04B 1/38
(52) U.S. Cl. ................... 379/22.08; 379/24; 379/1.03; 379/1.01; 379/27.01; 379/413; 375/222
(58) Field of Search .................. 379/387, 399.01, 379/413.02, 413, 413.04, 1.01, 1.03, 27.01, 27.02, 27.03, 27.04, 28, 29.07, 30, 22, 22.02, 22.03, 22.04, 22.08, 24; 375/222

(56) References Cited

U.S. PATENT DOCUMENTS

| | | | | |
|---|---|---|---|---|
| 6,014,425 A | * | 1/2000 | Bingel et al. ............ | 379/27.01 |
| 6,061,392 A | | 5/2000 | Bremer et al. ............ | 375/222 |
| 6,111,936 A | * | 8/2000 | Bremer ...................... | 379/28 |
| 6,154,524 A | * | 11/2000 | Bremer .................... | 379/27.01 |
| 6,345,071 B1 | * | 2/2002 | Hamdi ...................... | 375/222 |
| 6,549,568 B1 | * | 4/2003 | Bingel ...................... | 375/222 |
| 6,563,864 B1 | * | 5/2003 | Ibrahim et al. ............ | 375/222 |
| 6,567,464 B2 | * | 5/2003 | Hamdi ...................... | 375/222 |
| 6,574,308 B1 | * | 6/2003 | Macdonald et al. ........ | 379/1.04 |
| 6,587,502 B1 | * | 7/2003 | Hendrichs et al. ......... | 375/222 |

FOREIGN PATENT DOCUMENTS

WO    WO 99/20027    4/1999    ......... H04M/11/06

OTHER PUBLICATIONS

ITU–Telecommunication Standardization Sector, Jan. 18–22, 1999, Draft Recommendation G.992.2, pp. 1–152.
ITU–Telecommunication Standardization Sector, Oct. 12–23, 1998, G.994.1 Draft Document, pp. 1–35.
Tampere University of Technology Telecommunication Laboratory, Feb. 17, 1995, ADSL, pp. 1–20.

* cited by examiner

Primary Examiner—Rexford Barnie
(74) Attorney, Agent, or Firm—McDonnell Boehnen Hulbert & Berghoff

(57) ABSTRACT

A method for reducing audible noise in a telephone from a splitterless asymmetric digital subscriber line modem. The modem examines the shape of the power spectrum of fast retrain signals both when the telephone is on-hook and off-hook. By comparing the spectra, in particular the slopes of the spectra, the modem may determine the quality of the telephone that shares the telephone loop with the modem. The modem cuts back its transmitted power depending on the quality of the telephone by an amount that suppresses the audible noise in the telephone. In this manner, a customer may simultaneously use the telephone and the modem on the same telephone loop.

15 Claims, 4 Drawing Sheets though the method and system of the present invention is described with respect to a splitterless ADSL modem, it will be appreciated that other configurations of DSL systems may be used as well.

METHOD FOR REDUCING NOISE FROM AN ASYMMETRIC DIGITAL SUBSCRIBER LINE MODEM

FIELD OF INVENTION

The present invention relates to communications in digital subscriber lines. More specifically, it relates to a method for reducing audible noise from a splitterless asymmetric digital subscriber line modem.

BACKGROUND OF THE INVENTION

Digital Subscriber Line ("DSL") is a developing modem technology that allows existing copper telephone lines to carry high bandwidth information. Familiar twisted-pair telephone lines are then able to carry high speed data communication to and from a customer site in addition to retaining a plain old telephone service ("POTS") channel for voice communication. In DSL, digital data is transmitted to the customer site directly without being converted to an intermediary analogue signal. At the customer site, a DSL modem receives the downstream digital data for a customer from a central office for a telephone company and transmits upstream digital data from the customer to the central office.

One configuration of DSL is generally termed Asymmetric Digital Subscriber Line ("ADSL"). ADSL allows high-speed data transport to the customer site but only medium-speed data transfer from the customer site, whence the asymmetry. ADSL also allows the simultaneous use of the ADSL modem and POTS on the same telephone line. In this configuration, at a point where the twisted-pair telephone line enters the customer site, the POTS channel is split off from the ADSL modem by filters. One problem with this ADSL, however, is that a technician from the telephone company has to visit the customer site and install the splitter, referred to as "the truck roll."

To overcome this problem, another configuration of ADSL forgoes the requirement of a splitter at the customer site. This configuration is generally called "splitterless ADSL" and also goes under the name of "G.Lite." Splitterless ADSL is described in the International Telecommunications Union-Telecommunication Standardization Sector ("ITU-T", formerly known as the CCITT) standard identified by "G.992.2" which is incorporated herein by reference. ITU-T standards can be found on the World Wide Web at the Universal Resource Locator ("URL") "www.itu.ch." Splitterless ADSL modems include those manufactured by 3Com Corporation of Santa Clara, Calif., Lucent Technologies of Murray Hill, N.J., Texas Instruments of Dallas, Tex., and others.

In splitterless ADSL, an ADSL modem directly shares the same twisted-pair telephone line as a POTS telephone without the intervention of a splitter. Sharing the same twisted-pair telephone line, however, may result in some of the ADSL signal bleeding over into the audible frequency range of the POTS telephone. Audible noise effects, such as a buzzing in the earpiece or speaker, are heard on the POTS telephone when off-hook. The noise effect is the response of the internal circuitry of the telephone to the ADSL signal. Moreover, each telephone has a different response to the ADSL signal: some telephones can be rather quiet, such as many of the cordless telephones, while other telephones produce a severely loud effect making the telephone itself unusable.

It is desirable, therefore, to reduce the audible noise in the telephone from the ADSL modem without the introduction of a splitter. It is also desirable to achieve noise reduction for a wide range of telephone models. This may allow customers to use their telephones while the ADSL modem is transferring data.

SUMMARY OF THE INVENTION

In accordance with preferred embodiments of the present invention, some of the problems associated with audible noise in a POTS telephone from a splitterless ADSL modem are overcome. A method for reducing noise from an ADSL modem is provided. One aspect of the invention includes a method for reducing audible noise in a telephone from a splitterless Asymmetric Digital Subscriber Line modem, where the telephone and the modem share a telephone loop, to enable simultaneous use of the telephone and the modem. The method includes measuring a first spectral characteristic for the telephone loop when the telephone is on-hook. The first spectral characteristic is measured by the modem. The method further includes measuring a second spectral characteristic for the telephone loop when the telephone is off-hook. The second spectral characteristic is measured by the modem. A power cutback value is calculated for the modem. The power cutback value is determined from the first spectral characteristic and the second spectral characteristic. Transmitted power from the modem is limited by an amount equal to the power cutback value.

For example, the method and system of the present invention may provide for reduction of audible noise in the telephone from a G.Lite modem. The present method and system may achieve the noise reduction for a wide range of telephone models. The method and system described herein may allow customers to use their telephones while the G.Lite modem is transferring data.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
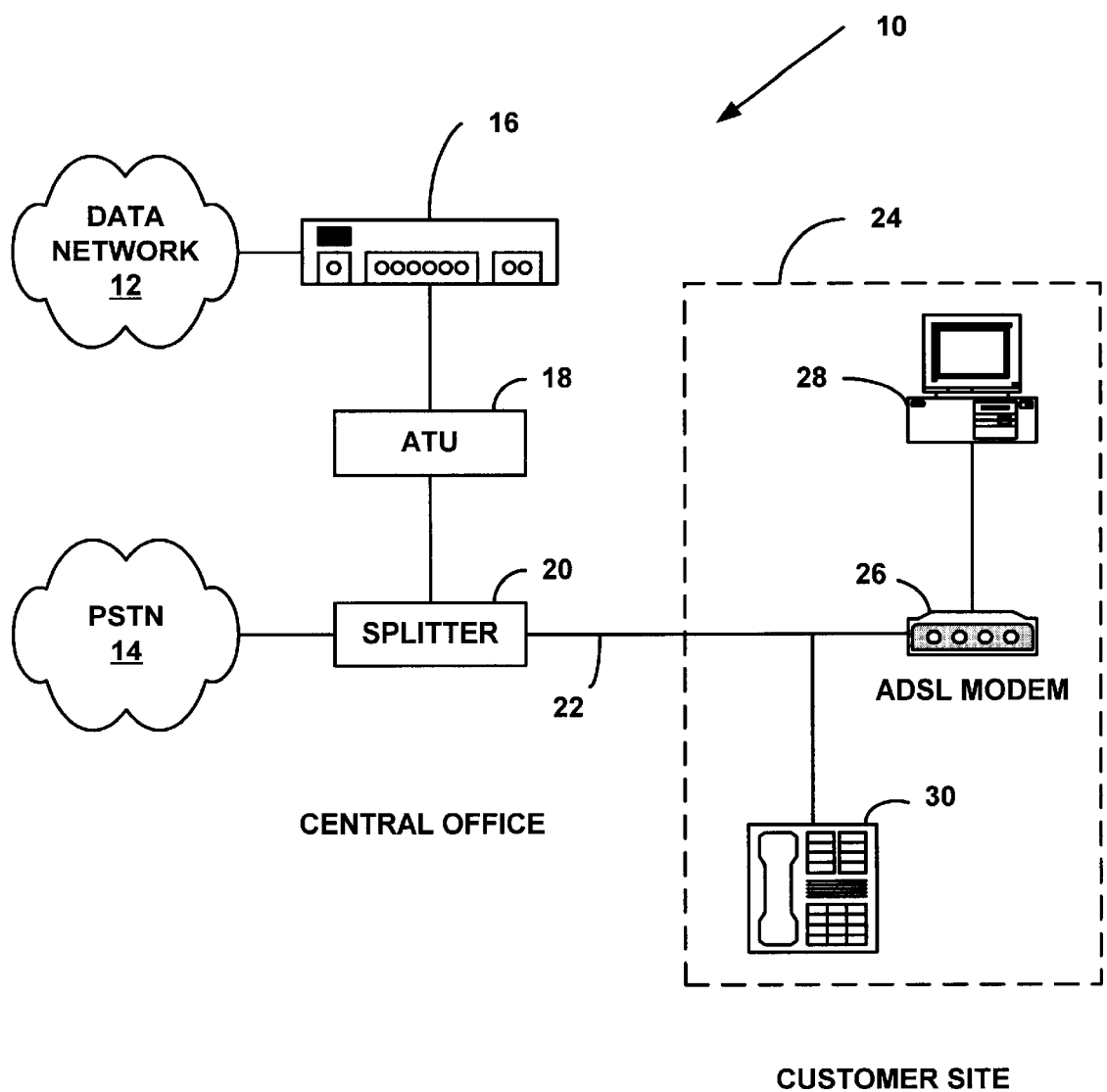
FIG. 1 is a block diagram illustrating a splitterless ADSL system.

FIG. 1 is a block diagram illustrating a splitterless ADSL system 10. The system 10 allows digital communications from a data network 12 and analog telephone signals from a Public Switched Telephone Network 14 ("PSTN") to be combined and sent to a customer site 24 over a customer loop 22 comprising twisted-pair copper wire. The PSTN 14 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, and others.

The digital data communications are received by a concentrator 16 at a telephone company's central office ("CO"). For example, data network 12 may be the Internet and the concentrator 16 may be a network hub that receives Internet Protocol packets and routes them to a particular network device connected to the network hub. Alternatively, the concentrator may 16 may be a DSL Access Multiplexer ("DSLAM") that links many ADSL telephone lines to the data network 12. The data intended for the customer site 24 is sent from the concentrator 16 to an ADSL Transceiver Unit 18 ("ATU") where it is converted to an ADSL signal.

A functional description of the conversion of data to an ADSL signal in the ATU 18 is to be found in ITU-T G.992.2. The ATU 18 takes the data from the concentrator 16 and frames the data. Thereafter, the ATU applies a cyclic redundancy check, scrambling, forward error correction, coding and interleaving. The data stream is then tone ordered and combined into a data symbol that is input to a constellation encoder. After constellation encoding, the data is modulated to produce an analog signal for transmission across the customer loop 22. The G.Lite signal permits high-speed downstream transfer of digital data from the central office to the customer site 24 at rates up to 1.536 Megabits per second ("Mbps").

The G.Lite high-speed downstream signal occupies a frequency range of approximately 138 to 552 kiloHertz ("kHz"). Analog voice signals from the PSTN 14, in contrast, occupy a low frequency range of zero to 4 kHz. The high frequency G.Lite signal from the ATU 18 and the low frequency analog signal from the PSTN 14 are combined in a frequency splitter 20 in the central office. The combined signal is sent over the customer loop 22 to the customer site 24.

At the customer site 24, the customer loop 22 from the central office connects to copper wiring within the customer site 24. For example, the copper wiring may be an internal home wiring system having multiple standard wall telephone outlets. A POTS telephone 30 and an ADSL modem 26 may be attached to the same internal copper wiring. Importantly, in the G.Lite version of ADSL, there is no splitter at the customer site for isolating the POTS analog signal from the high-frequency G.Lite signal. Both telephones 30 and ADSL modems 26 may be plugged into the same standard telephone outlets, avoiding the expense and delay of a visit by a technician from the telephone company for the purpose of installing the splitter. The ADSL modem 26 demodulates the G.Lite signal into data which is forwarded to customer premise equipment 28, e.g. a personal computing, multimedia, or video device.

Similarly, in the upstream channel from the customer site 24 to the central office, the ADSL modem 26 may receive data from the customer premise equipment 28 and convert it to an ADSL signal which is placed on the customer loop 22. At the same time, the telephone 30 may be off-hook and sending analog voice signals to the PSTN 14. The G.Lite upstream signal occupies a frequency range of approximately 26 to 134 kHz medium-speed upstream data transfer. Analog voice signals from the telephone 30 are in the low frequency range of zero to 4 kHz. The high frequency G.Lite signal from the ADSL modem 26 and the low frequency analog signal from the telephone 30 are both sent over the customer loop 22 to the central office. The G.Lite signal permits medium-speed upstream transfer of digital data from the customer site 24 to the central office at rates up to 512 kilobits per second ("kbps").

At the central office, the splitter 20 passes the low-frequency analog signals to the PSTN 14 and passes the high-frequency G.Lite signal to the ATU 18. The G.Lite signal is demodulated by the ATU 18 into data, passed to the concentrator 16, and sent to the data network 12.

An operating environment for the modems and ATUs of the present invention include a processing system with at least one Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Discrete Multi-Tone modulation

The ADSL modem 26 and the ATU 18 modulate data for transmission as a G.Lite signal and demodulate a received G.Lite signal back into data. An ADSL transmitter typically employs a multi-carrier modulator, utilizing Discrete Multi-Tone ("DMT") modulation. The DMT modulator may be implemented by mapping the data values to symbols specified by the magnitude and phase of each carrier, and then performing an inverse discrete Fourier transform ("IDFT"). The time domain sequence is then transmitted over the customer loop 22, which includes the effects of the subscriber line twisted pair wire and the analog components and amplifiers of the analog front ends of the ADSL transceivers. An ADSL receiver includes a DMT demodulator. The demodulator may be implemented utilizing a discrete Fourier transform ("DFT"), for which there are many algorithms, to recover the magnitude and phase of the symbols on each carrier. It is understood that in a typical ADSL configuration, each end of the communication channel uses both a transmitter and receiver, making an ADSL transceiver. The downstream transmission direction (from the central office to the customer site 24) uses a wider bandwidth than the return direction, or upstream direction.

As is known in the art, DMT is a method for dividing the available G.Lite bandwidth into 128 sub-channels from 0 to 552 kHz. Essentially, DMT splits the available bandwidth into a large number of sub-channels, each associated with a "bin" that is 4.3125 kHz wide. The frequency response of the customer loop 22 means that some bins have a higher data transport capacity compared to other bins. Data transport capacity is limited by noise on the customer loop 22, including external radio-frequency sources, thermal noise, and cross-talk from other customer loops. By measuring the frequency response of the customer loop 22, the system 10 may determine the data carrying capacity of each sub-channel. In this manner, DMT may allocate data so that the throughput of each sub-channel is maximized.

Figure 2:
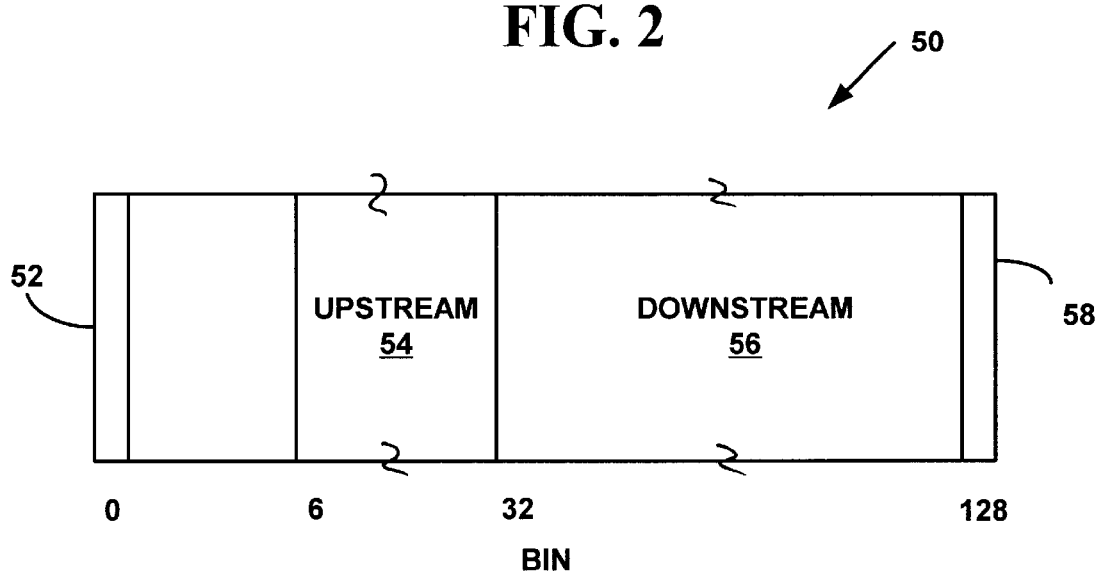
FIG. 2 is a diagram illustrating the available bandwidth for G.Lite modems.

FIG. 2 is a diagram illustrating the available bandwidth 50 for G.Lite modems. Bins 0 to 5, corresponding to 0 to 25.875 kHz, are reserved for POTS 52. Although the POTS 52 bandwidth is typically only about 4 kHz, DMT has large sidelobes that may bleed down to lower frequencies. Upstream data 54 is transmitted in bins 6 to 31, corresponding to 25.875 kHz to 138 kHz. With the inclusion of echo canceling, these bins may also permit medium speed downstream transfer. Downstream data 56 is transmitted in bins 32 to 127, corresponding to 138 kHz to 552 kHz. Finally, bin 128 corresponds to the Nyquist frequency 58 and no data is transmitted in this bin.

A Fast Retrain procedure is defined for G.Lite modems to adapt transmission characteristics to changing customer loop 22 conditions e.g. caused by telephone 30 on/off hook 20 transitions. As known to those skilled in the ADSL art, during the Fast Retrain procedure the ATU 18 sends a predetermined series of tones to the ADSL modem 26. The modem 26 at the other end of the customer loop 22 receives the tones and measures the power of the signal received in each bin. From these measurements, the modem 26 is able to determine the frequency response of the customer loop 22. From this, the modem 26 determines the signal-to-noise ratio ("SNR") in each bin and hence derives a value for the maximum data throughput for that bin. The modem 26 may then independently select a downstream modulation scheme from a set of previously negotiated modulation schemes to optimize the throughput for the downstream transmission bins. Similarly, the modem 26 sends a predetermined series of tones which are received by the ATU 18. The ATU 18 may also determine the maximum data throughput for each bin. The ATU 18 may then independently select an upstream modulation scheme from a set of previously negotiated modulation schemes to optimize the throughput for the upstream transmission bins.

Audible Noise Reduction

The ADSL modem 26 generates audible noise in the telephone 30 when the telephone is off hook. The DMT transmissions from the modem 26 reach the telephone 30 through the local telephone loop and interact with the electronics in the telephone 30. This interaction with the telephone 30 electronics in the absence of a splitter at the customer site is the source of the audible noise. Unless the power of the modem 26 is cut back, the customer may be unable to simultaneously use the telephone 30 whilst transferring data from the modem 26 because the audible noise is overwhelming.

The level of audible noise generated in the telephone 30 is dependent on the model of telephone. Some telephones are noisier than others. The degree of power cutback of the modem 26 required to suppress the audible noise is dependent on the model of telephone. Quieter models of telephones include: General Electric models 2-9221 and 2-9295; Lucent/AT&T models 210 and 9200; Bell South model 33012; and White-Westinghouse model WNCP-440. Once the transmitted power from the modem 26 is cut back by the required amount, the user may use the telephone 30 and the modem 26 simultaneously.

Figure 3:
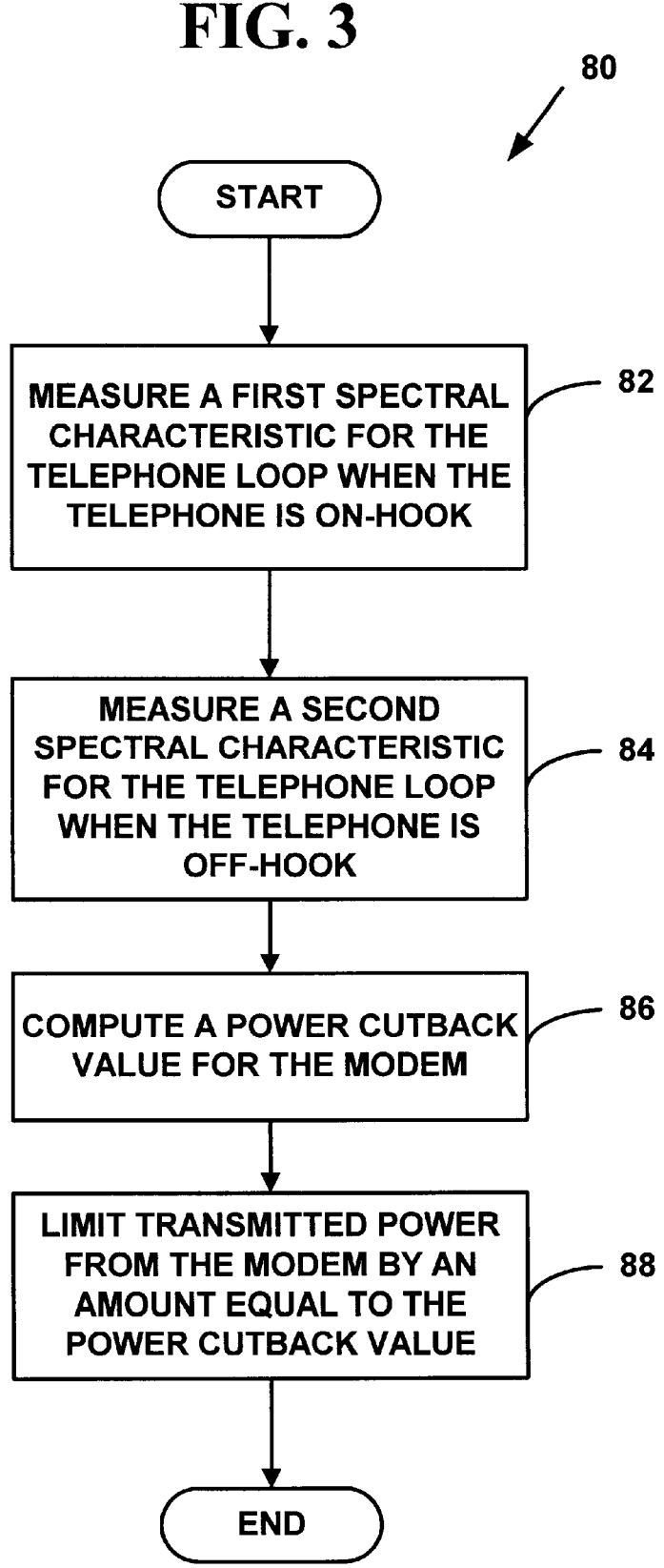
FIG. 3 is a flow diagram illustrating a method for reducing noise in a telephone from a splitterless ADSL modem.

FIG. 3 is a flow diagram illustrating a Method 80 for reducing audible noise in a telephone 30 from a splitterless Asymmetric Digital Subscriber Line modem 26. The telephone 30 and the modem 26 share a telephone loop 22. At Step 82, a first spectral characteristic is measured, by the modem 26, for the telephone loop 22 when the telephone 30 is on-hook. A second spectral characteristic for the telephone loop 22 is measured, by the modem 26, when the telephone 30 is off-hook at Step 84. At Step 86, a power cutback value for the modem 26 is computed. The power cutback value is determined from the first spectral characteristic and the second spectral characteristic. At Step 88, transmitted power from the modem 26 is limited by an amount equal to the power cutback value. In this manner, audible noise in the telephone 30 from the modem 26 is substantially reduced, enabling simultaneous use of the telephone 30 and the modem 26.

The power cutback required to suppress the audible noise depends on the quality of telephone 30 in the customer loop 22. The modem 26 may distinguish between a noisy telephone and a quiet telephone. In one exemplary preferred embodiment of the present invention, the modem 26 ascertains the quality of the telephone 30 with which it shares a local telephone loop 22 by monitoring Fast Retrain signals from the ATU 18. Fast Retrain, as mentioned above, are a series of tones, power levels, and procedures that allow G.lite modems to modify their transmission characteristics before entering a data transfer mode. The modem 26 monitors Fast Retrain signals while the telephone 30 is on-hook and again while the telephone 30 is off-hook. A comparison of both signals may indicate how the presence of the telephone 30 influences transmission characteristics of the local customer loop 22 and provides an indication of the quality of the telephone 30.

A Fast Retrain procedure may be initiated by either the ATU 18 or the ADSL modem 26. In the present invention, a Fast Retrain procedure may be initiated by the ADSL modem 26 under two circumstances. A first circumstance is when the modem 26 is starting up. The modem 26 requests an entry to Fast Retrain for the purpose of measuring a spectral characteristic of the customer loop 22 when the telephone 30 is not in the circuit, i.e. the telephone 30 is on-hook. In one exemplary preferred embodiment of the present invention the spectral characteristic is the slope of a C-REVERB-FR1 signal's envelope when the telephone 30 is on-hook. This entry is made from a handshake protocol, known to those skilled in the art as "G.hs," which is running on a CPU in the modem 26. C-REVERB-FR1 is described in Section 12 of ITU-T standard G.992, and G.hs is described in ITU-T standard "G.994.1" which is incorporated herein by reference.

The second circumstance for Fast Retrain is when the ATU 18 and modem 26 are in data transfer mode, also known to those skilled in the G.992 art as "Showtime" mode. If the modem 26 detects the telephone 30 going off-hook, it initiates the Fast Retrain procedure, according to the guidelines in Section 12.3 of G.992, for the purpose of measuring a spectral characteristic of the customer loop 22 when the telephone 30 is in the circuit, i.e. the telephone 30 is off-hook. In another exemplary preferred embodiment of the present invention this spectral characteristic is also the slope of the C-REVERB-FR1 signal's envelope, only now in the off-hook condition. Upon detection of the telephone 30 going off-hook, the modem 26 stops sending data and begins sending a R-RECOV signal. R-RECOV is a single tone signal corresponding to sub-carrier bin 20 without a cyclic prefix. R-RECOV is transmitted by the modem 26 at nominal power (−38 deciBels below one milliWatt per Hertz ("dBm/Hz")). When the ATU 18 detects the R-RECOV signal, it stops sending data and begins sending a C-RECOV signal. C-RECOV is a single tone signal corresponding to sub-carrier bin 68 without a cyclic prefix accompanied by a pilot sub-carrier in bin 64. The C-RECOV signal is transmitted by the ATU 18 at nominal power (−40 dBm/Hz). C-RECOV is sent for exactly 64 symbols, at which point the ATU 18 begins sending C-REVERB-FR1. C-REVERB-FR1 is associated with C-REVERB1, which is a wide-band signal described in Section 11.7 of G.992. The C-REVERB1 signal modulates a contiguous range of sub-carrier bins.

The modem 26 controls the length of the C-REVERB-FR1 signal. The ATU 18 continues to send the C-REVERB-FR1 signal until it measures the R-REVERB-FR1 for at least 32 symbols. The modem 26 continues to send R-RECOV while it measures the slope of the envelope of the C-REVERB-FR1 signal. In practice, the modem 26 only needs 64 symbols worth of the C-REVERB-FR1 signal to effectively characterize the slope of the envelope, at which point it would transition to sending the R-REVERB-FR1 signal in order to continue the Fast Retrain process with the ATU 18.

Figure 4:
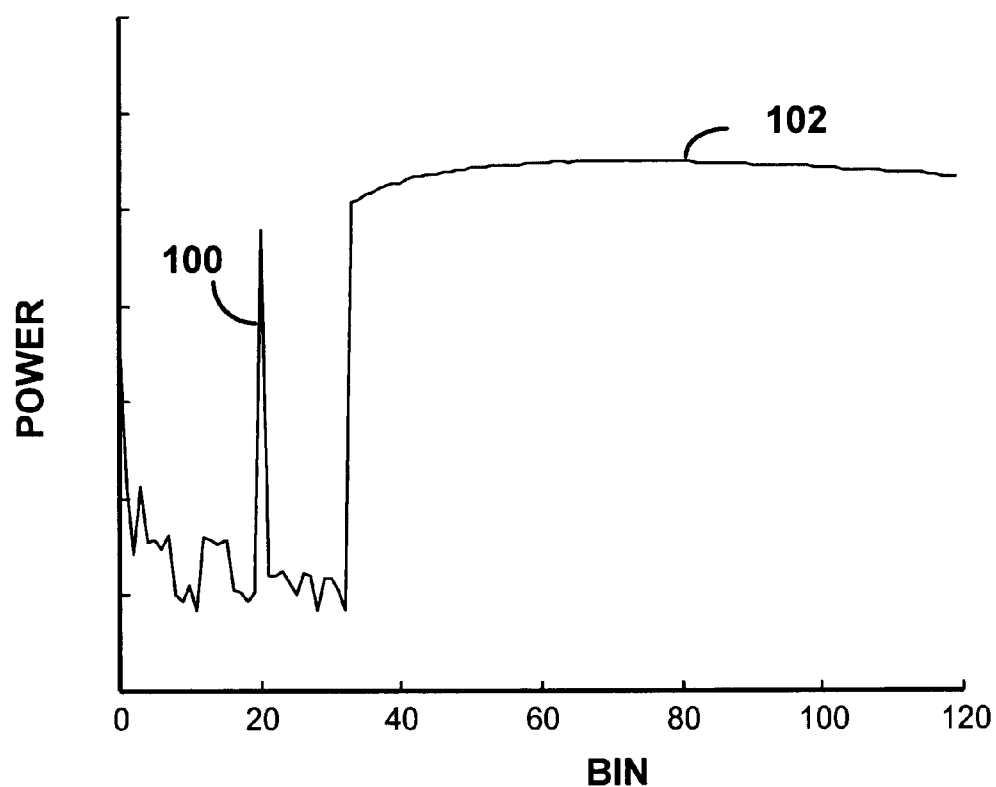
FIG. 4 is a graph illustrating an envelope of a typical on-hook C-REVERB-FR1 signal.

FIG. 4 is a graph illustrating an envelope 102 of a typical on-hook C-REVERB-FR1 signal. This signal was measured by the modem 26 on a 24 American Wire Gauge ("AWG") telephone line that is 4000 feet long. In this Figure, the upstream bins are from 6 to 31 and the R-RECOV tone 100 can be seen at bin 20. The envelope 102 represents a distribution of power measured by the modem 26 upon receiving the C-REVERB-FR1 tones from the ATU 18. The power is measured logarithmically with respect to a nominal power value.

The slope of the envelope 102 may be measured in several ways known to those skilled in the art. In one exemplary preferred embodiment, logarithmic power values may be measured for multiple bins and a straight-line fit performed to estimate the slope of the envelope 102. In another exemplary preferred embodiment, logarithmic power values may be measured for only two bins and a slope estimated from the two measurements. For example, the two bins may be chosen to be bin 51 corresponding to a lower frequency in the envelope 102 and bin 120 corresponding to a higher frequency in the envelope 102. An estimate for the slope of the envelope 102 may be derived from Equation 1.

$$\frac{\log(\text{Average Power in Bin 120}) - \log(\text{Average Power in Bin 51})}{120 - 51} \tag{1}$$

The average power in each bin is calculated by squaring the real and imaginary values produced by a Fast Fourier Transform ("FFT") process, and adding the two values together. Accumulating these values over 64 symbols for both bin 51 and bin 120, and dividing each of these results by 64 yields the average power in each of these bins. For example, the slope of the envelope 120 for the on-hook telephone 30 measured by the modem 26 on a 24 American Wire Gauge ("AWG") telephone line that is 4000 feet long is typically found to be approximately −0.012 deciBels per bin ("dB/bin").

In another exemplary preferred embodiment of the present invention, an estimate of the quality of the telephone 30 may be made by computing a difference between the slope of the C-REVERB-FR1 signal while the telephone 30 is on-hook and the slope of another C-REVERB-FR1 signal while the telephone 30 is off-hook. The difference in slope between the on-hook and off-hook values is typically independent of the length of the loop 22 because we are taking a difference between logarithms of average power. We have determined that if the slope difference satisfies Equation 2, then telephone 30 is typically a noisy telephone.

$$\text{Slope(on-hook)} - \text{Slope(off-hook)} > 0.036 \text{ dB/bin} \tag{2}$$

Equivalently, expressed in other units, the slope difference is $8.4 \times 10^{-3}$ dB/kHz.

Equation 2 sets an approximate threshold for determining the quality of the telephone 30 on the customer loop 22 with the modem 26. In one exemplary preferred embodiment of the present invention, a noisier telephone 30, i.e. where the slope satisfies Equation 2, requires a cutback of approximately 24 dB in power transmitted by the modem 26 in the upstream bandwidth 54 to suppress the audible noise. The power cutback value is measured with respect to the nominal transmitted power value of −38 dBm/Hz for the modem 26. In another exemplary preferred embodiment, a quieter telephone 30, i.e. where the slope does not satisfy Equation 2, only requires a power cutback of approximately 12 dB by the modem 26. The power cutback may be applied during an R-REVERB-FR3 period of Fast Retrain. However, it should be understood that the present invention is not restricted to these power cutback values and that other values are possible.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for reducing audible noise in a telephone from a splitterless Asymmetric Digital Subscriber Line modem, where the telephone and the modem share a telephone loop, to enable simultaneous use of the telephone and the modem, the method comprising the steps of:

measuring a first spectral characteristic for the telephone loop when the telephone is on-hook, wherein the first spectral characteristic is measured by the modem, and wherein measuring the first spectral characteristic comprises:

detecting a first plurality of tones in the modem, wherein the first plurality of tones is transmitted from a central office to the modem over the telephone loop while the telephone is on-hook; and calculating an on-hook power slope value in response to detecting the first plurality of tones, wherein the first spectral characteristic is the on-hook power slope value, and wherein the on-hook power slope value is a measure of change of power with rising frequency for the first plurality of tones;

measuring a second spectral characteristic for the telephone loop when the telephone is off-hook, wherein the second spectral characteristic is measured by the modem, and wherein measuring the second spectral characteristic comprises:

initiating transmission of a second plurality of tones from the central office to the modem over the telephone loop in response to the telephone going off-hook;

detecting the second plurality of tones in the modem, wherein the second plurality of tones is transmitted from the central office to the modem over the telephone loop while the telephone is off-hook; and calculating an off-hook power slope value in response to detecting the second plurality of tones, wherein the second spectral characteristic is the off-hook power slope value, and wherein the off-hook slope value is a measure of change of power with rising frequency for the second plurality of tones;

computing a power cutback value for the modem, wherein the power cutback value is determined from the first spectral characteristic and the second spectral characteristic; and limiting transmitted power from the modem by an amount equal to the power cutback value.

2. A computer readable medium having stored therein instructions for causing a central processing unit to execute the method of claim 1.

3. The method of claim 1 wherein the step of calculating the on-hook power slope value comprises the steps of:

obtaining a first logarithmic power value in a first bin, wherein the first bin corresponds to one of the first plurality of tones having a first frequency, and wherein the first logarithmic power value corresponds to average power in the first bin;

obtaining a second logarithmic power value in a second bin, wherein the second bin corresponds to another of the first plurality of tones having a second frequency, and wherein the second logarithmic power value corresponds to average power in the second bin; and computing the on-hook power slope value proportional to the first logarithmic power value minus the second logarithmic power value.

4. The method of claim 1 wherein the step of calculating the off-hook power slope value comprises the steps of:

obtaining a third logarithmic power value in a third bin, wherein the third bin corresponds to one of the second plurality of tones having a third frequency, and wherein the third logarithmic power value corresponds to average power in the third bin;

obtaining a fourth logarithmic power value in a fourth bin, wherein the fourth bin corresponds to another of the second plurality of tones having a fourth frequency, and wherein the fourth logarithmic power value corresponds to average power in the fourth bin; and computing the off-hook power slope value proportional to the third logarithmic power value minus the fourth logarithmic power value.

5. The method of claim 1 wherein the first plurality of tones and the second plurality of tones are Fast Retrain tones.

6. The method of claim 1, wherein the computing step comprises the steps of:

computing a difference between the first spectral characteristic and the second spectral characteristic;

determining whether the difference is less than a threshold value; and when the difference is less than the threshold value, setting the power cutback value equal to a first value, wherein the first value is associated with power cutback for a good quality telephone.

7. The method of claim 6, wherein the transmitted power from the modem is measured with respect to a nominal transmitted power for the modem.

8. The method of claim 6, wherein the first value is approximately 12 decibels.

9. The method of claim 6, wherein the computing step further comprises the steps of:

setting the power cutback value equal to a second value, wherein the second value is associated with power cutback for a noisy telephone, when the difference exceeds the threshold value.

10. The method of claim 9, wherein the transmitted power from the modem is measured with respect to a nominal transmitted power for the modem.

11. The method of claim 9, wherein the second value is approximately 24 decibels.

12. The method of claims 6, wherein the threshold value is approximately $8.4 \times 10^{-3}$ deciBels per kiloHertz.

13. A method for reducing audible noise in a telephone from a splitterless Asymmetric Digital Subscriber Line modem, where the telephone and the modem share a telephone loop, to enable simultaneous use of the telephone and the modem, the method comprising the steps of:

detecting a first plurality of Fast Retrain tones in the modem, wherein the first plurality of Fast Retrain tones is transmitted from a central office to the modem over the telephone loop while the telephone is on-hook;

calculating an on-hook power slope value in response to detecting the first plurality of Fast Retrain tones, wherein the on-hook power slope value is a measure of change of power with rising frequency for the first plurality of Fast Retrain tones;

initiating transmission of a second plurality of Fast Retrain tones from the central office to the modem over the telephone loop in response to the telephone going off-hook;

detecting the second plurality of Fast Retrain tones in the modem, wherein the second plurality of Fast Retrain tones is transmitted from the central office to the modem over the telephone loop while the telephone is off-hook;

calculating an off-hook power slope value in response to detecting the second plurality of Fast Retrain tones, wherein the off-hook power slope value is a measure of change of power with rising frequency for the second plurality of Fast Retrain tones;

computing a difference between the on-hook power slope value and the off-hook power slope value;

determining whether the difference is less than a threshold value;

when the difference is less than the threshold value, setting the power cutback value equal to approximately 12 deciBels;

when the difference exceeds the threshold value, setting the power cutback value equal to approximately 24 deciBels; and limiting transmitted power from the modem by an amount equal to the power cutback value, wherein the transmitted power from the modem is measured with respect to a nominal transmitted power for the modem.

14. A computer readable medium having stored therein instructions for causing a central processing unit to execute the method of claim 13.

15. The method of claim 13, wherein the threshold value is approximately $8.4 \times 10^{-3}$ deciBels per kiloHertz.

* * * * *